United States Patent [19]

Richardson et al.

[11] Patent Number: 4,826,650

[45] Date of Patent: May 2, 1989

[54] ULTRASONIC EXAMINATION OF REACTOR PRESSURE VESSEL TOP GUIDE

[75] Inventors: David L. Richardson, Los Gatos; Jack P. Clark, San Jose; Peter M. Patterson, Livermore; Richard W. Perry, San Jose, all of Calif.

[73] Assignee: General Electric Company, San Jose, Calif.

[21] Appl. No.: 49,243

[22] Filed: May 13, 1987

[51] Int. Cl.[4] .............................................. G21C 17/00
[52] U.S. Cl. .................................. 376/249; 376/252; 73/620
[58] Field of Search ...................... 376/249, 252, 245; 73/620, 625; 165/11.1, 11.2

[56] References Cited

U.S. PATENT DOCUMENTS

| 4,052,889 | 10/1977 | Mucciardi et al. | 73/620 |
|---|---|---|---|
| 4,294,118 | 10/1981 | Shiraiwa et al. | 73/620 |
| 4,385,523 | 5/1983 | Gugel et al. | 376/249 |
| 4,424,813 | 1/1984 | Havlice et al. | 73/620 |
| 4,434,659 | 3/1984 | Kurtz et al. | 73/620 |
| 4,457,174 | 7/1984 | Bar-Cohen et al. | 73/620 |
| 4,472,346 | 9/1984 | Takeda et al. | 376/252 |
| 4,532,808 | 8/1985 | Wentzell et al. | 376/249 |
| 4,548,785 | 10/1985 | Richardson et al. | 376/249 |
| 4,642,215 | 2/1987 | Klinvex et al. | 376/249 |

FOREIGN PATENT DOCUMENTS

| 0081747 | 6/1983 | European Pat. Off. | 376/252 |
|---|---|---|---|
| 0281997 | 12/1986 | Japan | 376/252 |
| 2066157 | 3/1987 | Japan | 73/620 |
| 2067446 | 3/1987 | Japan | 73/620 |

OTHER PUBLICATIONS

UT Operator Training for Intergranular Stress Corrosion Cracking published by the Electric Power Research Institute Nondestructive Evaluation Center of Charlotte, North Carolina, 1983.

Primary Examiner—Deborah L. Kyle
Assistant Examiner—Daniel Wasil
Attorney, Agent, or Firm—Robert R. Schroeder

[57] ABSTRACT

In a boiling water reactor, an apparatus and process for ultrasound inspection of the top guide is disclosed. The top guide constitutes a lattice of stainless steel bars overlying the core plate and being assembled at confronting grooves with the lattice mounted at the side edges to the reactor pressure vessel. This lattice braces the upper ends of the vertically supported fuel assemblies in their requisite orientation and spaced apart relation to enable among other things the required spatial interval to be maintained for control rod moderation of the reaction. Because of the proximity of the top guide to the fuel assemblies, the individual bars making up the lattice need to be checked for cracking, especially that cracking produced by irradiation assisted stress crack corrosion. With a defined cell in the lattice emptied of its contained and adjoining fuel assemblies, there is disclosed an ultrasound test for cracking. A sound transducer on a first special frame sweeps horizontally across the top of a bar interrogating the bar with vertical ultrasound waves for detecting horizontal cracks. Similarly, a sound transducer on a second special frame sweeps vertically across the side of a bar interrogating the bar with angularly incident horizontal ultrasound waves for detecting vertical cracks. Nondestructive testing of the lattice assembly occurs without required disassembly.

5 Claims, 4 Drawing Sheets

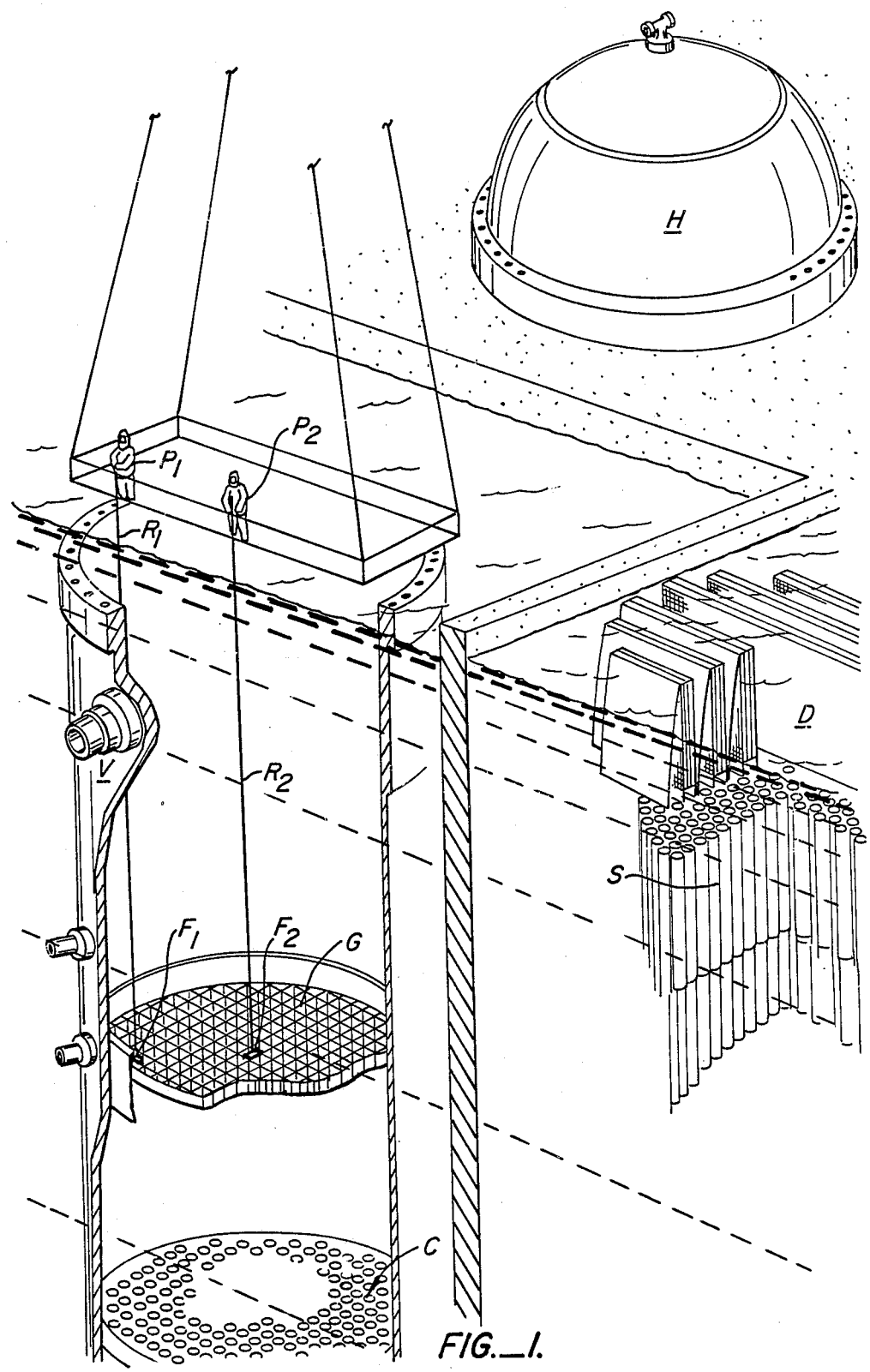
FIG._1.

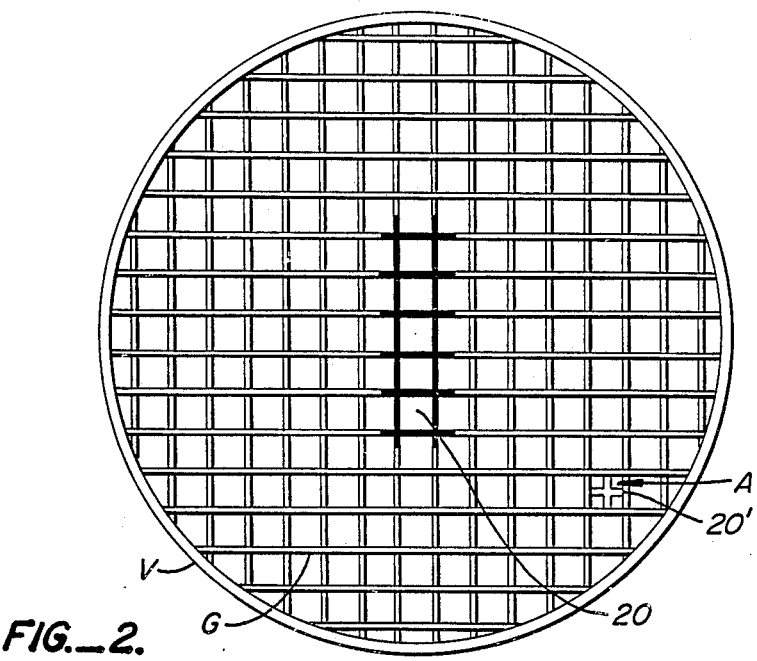
FIG._2.
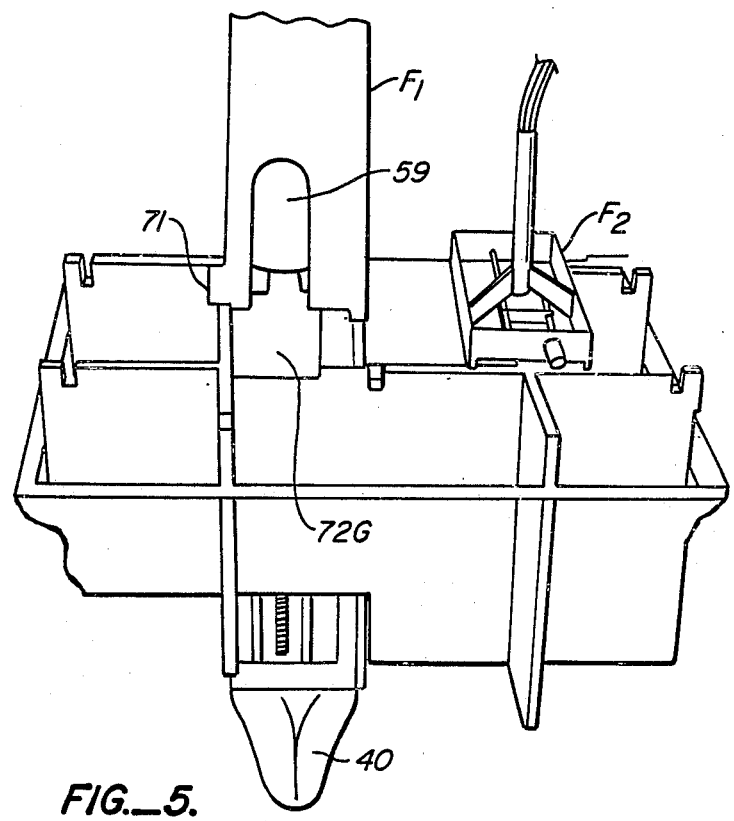
FIG._5.

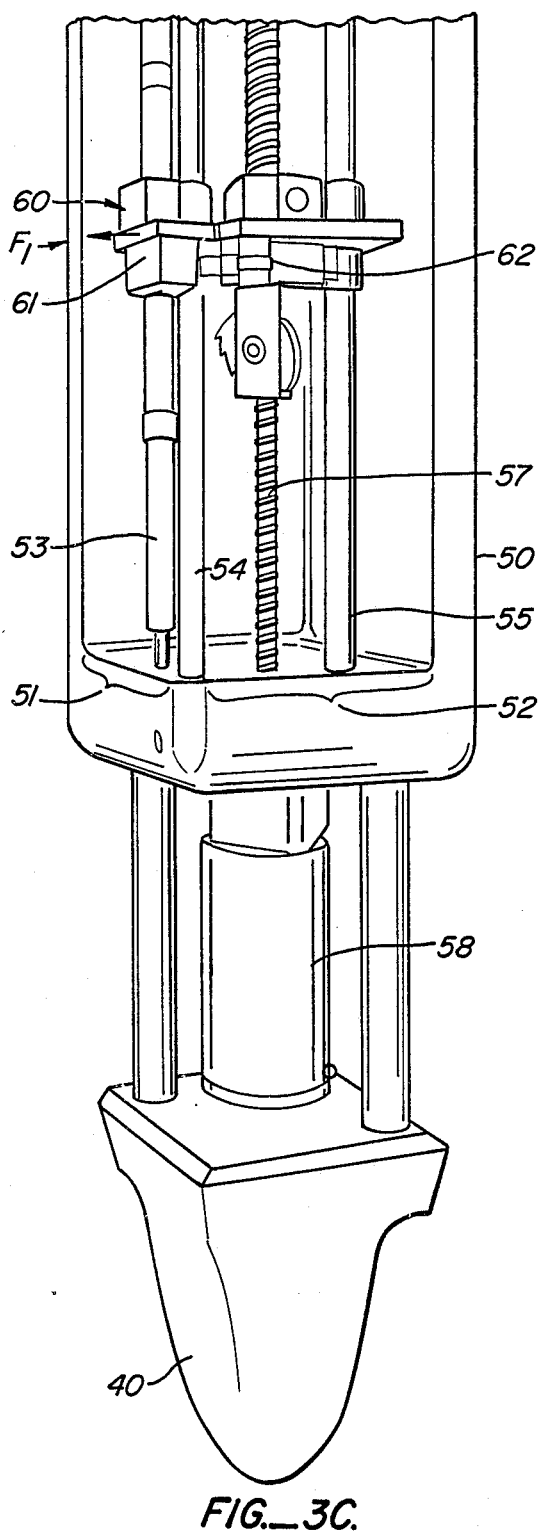
FIG._3C.
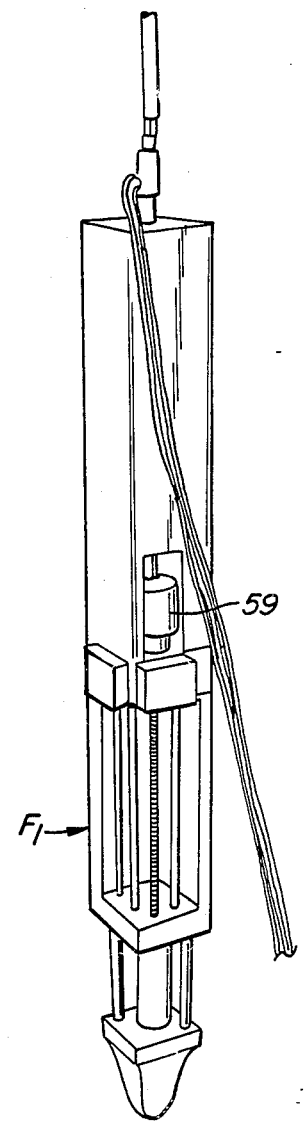
FIG._3A.
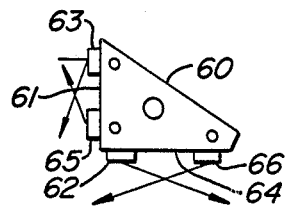
FIG._3B.

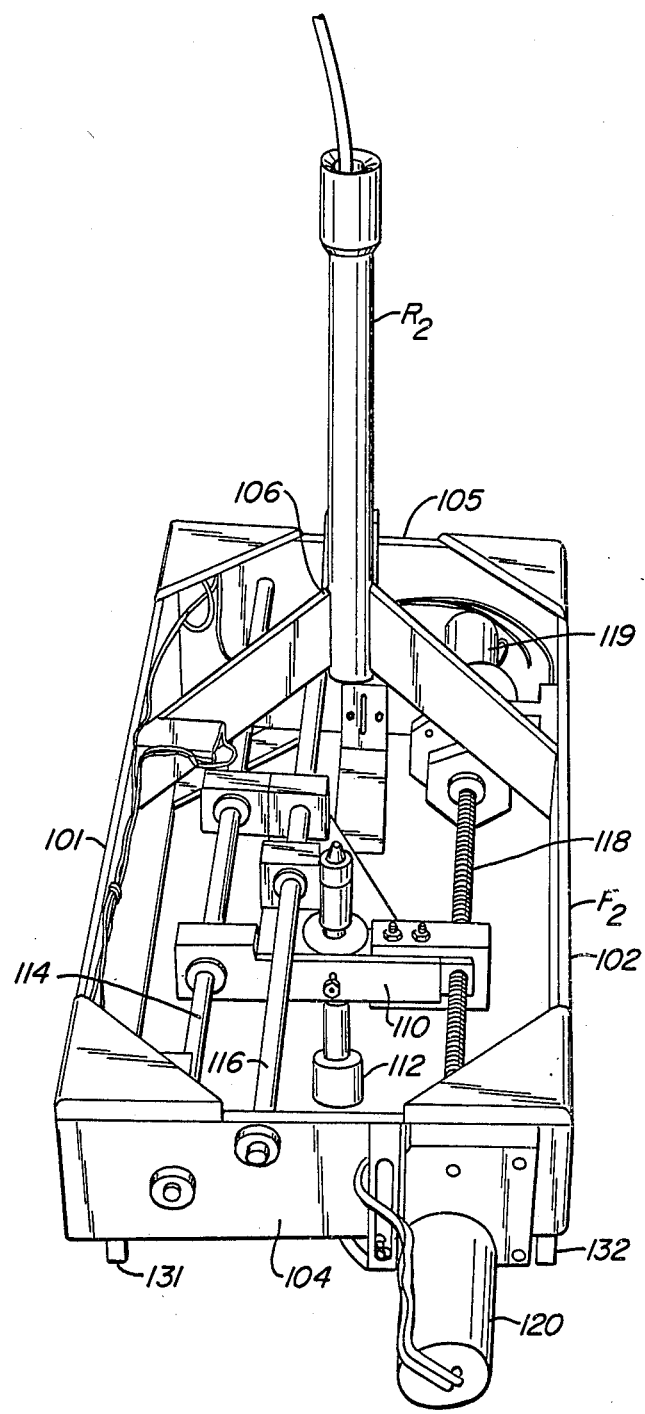
FIG._4.

ULTRASONIC EXAMINATION OF REACTOR PRESSURE VESSEL TOP GUIDE

BACKGROUND OF THE INVENTION

This invention relates to ultrasound testing. More particularly, the invention relates to remote ultrasound testing of a lattice-like nuclear reactor vessel top guide and sets forth a protocol wherein testing can occur without lattice disassembly.

STATEMENT OF THE PROBLEM

Reactors constitute extremely hostile environments for inspection of any kind. First, reactors are notorious for their radioactivity. Secondly, the internals of the reactors are frequently mechanically inaccessible. A classic example of such inaccessibility is the top guide used in a boiling water reactor.

The top guide comprises a series of bars in the order of ¼ inch thick and 9 to 13 inches in width. The bars each span the full diameter of the reactor vessel which can be in the order of 22 feet. The bars are grooved. The grooves extend through half the width of the bars. The grooves in parallel bars extend in the same direction. For example, one set of bars has its grooves upwardly disposed; bars at right angles have their grooves downwardly disposed.

The bars are assembled in a lattice by confronting their respective grooves. They come together in a lattice-like structure that is not unlike the cardboard separators found in wine cases. This continuous lattice, once assembled, is welded at the side edges to a ring on the reactor vessel. The bars of the lattice are not otherwise welded or attached to themselves.

The lattice defines a number of discrete square cells bounded by the intersecting bars forming parallel sides. The function of the top guide is for preserving the vertical and rotational orientation of square sectioned elongate fuel assemblies supported on a core plate some 14 feet below the top guide. The top guide braces and maintains the top of the fuel assemblies. The fuel assemblies are maintained vertical by the top guide. Moreover, the top guide forms the support surface from which the rotational orientation of the fuel assemblies is maintained. By bracing the fuel assemblies to the top guide, the vital cruciform shaped interstitial area between the fuel assemblies for control rod penetration and moderation of the reaction is maintained.

Unfortunately, the top guide is in an ideal place for cracking to occur. First, the bars making up the top guide have numerous discontinuities. These discontinuities include the very grooves which enable the top guide bars to be assembled in their latticelike configuration. Additionally, various other discontinuities are present in the bars. For example, notches for the hanging of poison curtains used in the start-up of older reactors constitute such discontinuities.

Further, the bars in spanning the reactor vessel and aligning the fuel assemblies are subject to stress. This stress is aggravated by the fact that the bars at their respective points of intersection are not fastened one to another.

Additionally, the bars making up the top guide are subject to high radiation dosage. Consequently, the bars are ideal sites for irradiation assisted stress corrosion cracking (IASCC). IASCC occurs in many stainless steels when an irradiation dosage exceeds $2 \times 10^{21}$ neutrons per $cm^2$. Thus, when older reactors approach this dosage level, there is high motive to examine the top guide for IASCC.

It goes without saying that removal and disassembly of the bulky radioactive lattice comprising the top guide is possible—but prohibitively inconvenient and expensive.

SUMMARY OF THE PRIOR ART

Ultrasound testing is a nondestructive technique well known. In the usual application, an ultrasound transducer is manually fastened to an article —typically piping—to be nondestructively tested. A transducer imparts an ultrasound pulse to the article to be tested. The pulse fully penetrates the article to be tested and is reflected. The pulse upon being reflected is detected, usually at the very transducer which initiated the pulse. The detection of the pulse at the transducer is recorded and analyzed.

It is conventional to time the receipt of reflected pulses. By noting the reflected pulses, one can determine whether an intact part at an extremity causes the return pulse or an interfering crack at a location other than the extremity causes reflection.

Since transducers, power equipment, recorders, monitors and computers for analyzing ultrasound are all known and conventional, further description will not be set forth herein. For more complete detail on the testing referred to herein, the readers attention is invited to the publication UT Operator Training for Intergranular Stress Corrosion Cracking published by the Electric Power Research Institute Nondestructive Evaluation Center of Charlotte, N.C., 1983.

SUMMARY OF THE INVENTION

In a boiling water reactor, an apparatus and process for ultrasound inspection of the top guide is disclosed. The top guide constitutes a lattice of stainless steel bars overlying the core plate and being assembled at confronting grooves with the lattice mounted at the side edges to the reactor pressure vessel. This lattice braces the upper ends of the vertically supported fuel assemblies in their requisite orientation and spaced apart relation to enable among other things the required spatial interval to be maintained for control rod moderation of the reaction. Because of the proximity of the top guide to the fuel assemblies, the individual bars making up the lattice need to be checked for cracking, especially that cracking produced by irradiation assisted stress crack corrosion. With a defined cell in the lattice emptied of its contained and adjoining fuel assemblies, there is disclosed an ultrasound test for cracking. A sound transducer on a first special frame sweeps horizontally across the top of a bar interrogating the bar with vertical longitudinal ultrasound waves for detecting horizontal cracks. Similarly, a sound transducer on a second special frame sweeps vertically across the side of a bar interrogating the bar with angularly incident horizontal shear ultrasound waves for detecting vertical cracks. Nondestructive testing of the lattice assembly occurs without required disassembly.

Two test frames are disclosed, a first test frame for checking the lattice assembly for horizontal cracking and a second test frame for checking the lattice for vertical cracking. Before the test, it is required that all fuel assemblies adjacent the bars to be tested are removed.

A first test frame has the cross section of of a fuel channel and is configured for detecting vertical cracking. This frame engages orthogonally disposed bars at their defined corners and comes to rest. A ball screw driven carriage is given vertical excursion along each bar of the defined corner. Each bar at the defined corner is interrogated by ultrasound from paired transducers. The paired transducers are oriented to have opposed acoustical angles of incidence to the bar in the order of 70° in a horizontal plane towards the bars. One transducer sweeping each bar interrogates the bar with horizontal shear wave ultrasound towards the corner defined by the bar; the remaining transducer sweeping each bar interrogates the bar with horizontal shear wave ultrasound away from the corner defined by the bar. The vertically sweeping transducers therefore interrogate each bar with acoustical signals horizontally and in opposite directions to detect vertical cracking.

The second test frame is configured for detecting horizontal cracking. The second test frame is configured for precise placement on the lattice overlying the portion of a bar to be tested. In the preferred embodiment, the carriage rest one leg on the bar to be tested and its rear two legs on an intersecting bar on the top of the top guide assembly. The second test frame includes a carriage mounted to a ball screw drive. This carriage contains an ultrasound transducer and sweeps horizontally the transducer immediately over the bar to be tested. The horizontally moving transducer interrogates the bar with vertically interrogating sound to locate horizontal cracking.

In both types of test frames, each transducer (one transducer for vertical acoustical interrogation and four transducers for horizontal acoustical interrogation) couple through the demineralized water of the reactor to enable complete nondestructive testing of the top guide without costly disassembly.

BRIEF DESCRIPTION OF THE DRAWINGS

Other objects features and advantages of this invention will be more apparent after referring to the following specification and attached drawings in which:

FIG. 1 is a perspective of a boiling water reactor vessel having the vessel head, steam dryer and steam separator all removed with the process and apparatus of this invention shown interrogating the lattice-like top guide of the reactor;

FIG. 2 is a plan view of the top guide of FIG. 1 illustrating a pattern of removal of the fuel assemblies for the disclosed ultrasound testing of the top guide;

FIG. 3A and 3C are respective small and enlarged perspective views of a fuel channel sectioned top guide ultrasound test frame for vertically sweeping from a cell corner sound transducers, with the sound transducers emanating angularly incident horizontal ultrasound waves for the detection of vertically aligned cracking;

FIG. 3B is a plan view of the vertically sweeping carriage illustrating the carriage and the 70° angle of incidence of ultrasound to and from the bar;

FIG. 4 is a perspective view of a cradle assembly for horizontally sweeping along a top side edge of a bar at the upward portion of the lattice of the top guide, the acoustical transducer interrogating the bar with vertical signals for the presence of horizontal tracks; and, FIG. 5 is a view of a portion of the top guide with the apparatus of FIG. 3A and 4 in place for acoustically interrogating the top guide with respective horizontal and vertical acoustical signals to test for the presence of respective vertically and horizontally aligned cracks.

Referring to FIG. 1, a reactor vessel V is shown shut down and open having its head H, dryer D and steam separator S all removed. Working personnel P1 and P2 are shown standing on a work platform overlying the top guide G some 50 feet deep within the reactor. Worker P1 through rod R1 manipulates frame F1 for the interrogation of the reactor top guide for vertical cracking; similarly worker P2 through rod R2 manipulates frame F2 for the interrogation of the top guide G for horizontal cracking.

Typically, such an inspection will occur when portions of the top guide have been exposed to radiation in the order of $2 \times 10^{21}$ neutrons/cm$^2$. It is at this dosage level that the stainless steel of the top guide assembly G can begin to have that phenomenon known as irradiation assisted stress crack corrosion (IASCC).

Referring to FIG. 2, a plan view of the top guide G is illustrated within the reactor vessel V. Top guide G is shown to be a lattice-like structure of intersecting bars. These bars typically overlie a core plate C (see FIG. 1) and define discrete cells 20. As is well known in the prior art, the cells 20 each brace the tops of four fuel assemblies. The cells 20 of the top guide G hold the fuel assemblies at their upward end remote from the core plate C which supports the weight of the fuel assemblies. The function of the top guide G is at least two fold in nature.

First, the top guide G maintains the fuel assemblies in their upright position.

Secondly, the top guide G maintains the fuel assemblies with their sides parallel to one another and spaced apart from one another. This enables among other things, the control rods to penetrate the cruciformed shaped interstices between four fuel assemblies. Such a configuration of four fuel assemblies A maintained by the top guide assembly is shown at cell 20' in FIG. 2.

In order for a test of this invention to be conducted, it is preferred that each cell 20 have the fuel assemblies A removed. This prevents protrusion of the fuel channels of the fuel assembly from interfering with the test procedures herein set forth. The area of fuel assembly removal is shown in heavy solid lines. It will be understood that fuel assemblies on both sides of the portion of the top guide G designated by the heavy lines are removed.

Having set forth the ambient within which testing occurs, the tests will now be described. First, a test frame F1 will be illustrated with respect to FIG. 3A and 3B. Its placement in testing a portion of the top guide G will be set forth with respect to FIG. 5. Thereafter and with reference to FIG. 4, a test frame F2 will be set forth. Its placement in testing top guide G will also be set forth with respect to FIG. 5.

Referring to FIG. 3A, frame F1 includes a nose piece 40 having the shape of a finder and a main body 50 having the approximate section of a fuel channel of a typical fuel assembly. A carriage 60 is shown mounted for vertical excursion along two respective open and therefore exposed sides 51, 52 of frame F1. The carriage rides on three bars 53, 54, and 55. The carriage is propelled by a ball screw (imbedded in the carriage 60 and therefore not shown) following a rotating threaded shaft 57. Rotation of shaft 57 is monitored at shaft encoder 58 and caused by motor 59 at the top of the assembly. Conventional rotation of motor 59 and tracking of rotation at shaft encoder 58 enables precise positioning of the carriage 60 to be known.

Carriage 60 includes a carriage face 61 parallel to open side 51 and a second carriage face 62 parallel to open side 52. Faces 51, 52 each confront a bar at the corner of a cell in a top guide.

Referring to FIG. 3B, carriage 60 is illustrated in plan with its two faces 61, 62. Each of the faces 61, 62 have paired transducers. These transducers are 63 and 65 on face 61 and 64 and 66 on face 62.

Transducer 63 sends a signal at 70° way from face 61 towards the corner defined by the intersection of the faces 61, 62. Transducer 65 adjacent the corner of faces 61, 62 sends an acoustical signal horizontally at 70° away from the corner defined by faces 61, 62. The acoustical signals of transducers 64, 66 on face 62 are correspondingly angularly incident towards and away from the swept cell corner.

The purpose of these opposed angularly incident signals may readily be understood. Specifically, the transducers 63, 65 will pass immediately over the bar that they are interrogating. In such passage, the acoustical signals must be given an angle of incidence wherein penetration of the bar with the acoustical signal and detection of the returned acoustical signal is assured. By the specific orientation herein disclosed, thorough checking of a bar at the corner of a discrete cell in guide G is assured; one transducer interrogates to the corner, the remaining transducer interrogates away from the corner; as can be seen, vertical sweep across the entire width of the bar by the transducers thoroughly interrogates the full width of the bars forming the corner with horizontal ultrasound to detect vertical cracking.

Turning to FIG. 5, positioning of the bar to the top guide G can be understood. Specifically, paired plates 71, 72 are positioned on the exterior of test frame F1. These plates define an inwardly extending angle, which angle braces frame F1 to a corner of the discrete cell illustrated in FIG. 3. Once the frame F1 is so positioned, excursion and acoustical interrogation in a horizontal plane of the illustrated transducers 63, 65 and 64, 66 occurs.

It can be understood that all of the bars defining a discrete cell can be tested. This can occur by positioning frame F1 in each of the respective corners of a defined cell. With repeat of this procedure, acoustical sweeping of the bars of the top guide with horizontally interrogating acoustical signals for the detection of vertical cracks can occur.

Referring to FIG. 4, frame F2 is illustrated. It includes longitudinal sides 101, 102 and ends 104, 105. These sides and ends form a rigid frame structure connected at a yoke 106 to rod R2. Paired rods 114, 116 form points of support for the excursion of a carriage 110. Carriage 110 has mounted there below an ultrasound transducer 112. Carriage 110 is driven by a threaded shaft 118 at a ball screw imbedded within the carriage 110 (not shown). Motor 119 causes shaft 118 to rotate. A shaft encoder 120 determines the precise position of the carriage 110.

Feet 131, 132 rest upon a bar parallel to section 104 of the rotor. A forward foot from bar 105 (obscured in the view here shown) preferably rests on the bar tested at a portion within the next cell on top guide G.

Turning to FIG. 5, placement of the frame F2 is illustrated. Referring back to FIG. 4 it will be understood that transducer 112 undergoes excursion the length of the frame. The single transducer 112 interrogates with vertical ultrasound waves a bar for horizontal cracking. Thus the fixtures set forth in Figs. 3A and 3B and FIG. 4 are capable of remotely interrogating the lattice of top guide G for horizontal and vertical cracking.

What is claimed is:

1. A process of testing a top guide assembly in a boiling water reactor having a horizontally disposed lattice constructed of orthogonally intersecting bars defining discrete cells for orienting fuel assemblies at their respective ends in vertically disposed spaced apart relation, said process comprising the steps of:
   removing the fuel assemblies adjoining the bars to be tested;
   providing a first transducer emanating a vertical ultrasound signal;
   sweeping said first transducer horizontally along the top side edge of a bar to interrogate said bar with vertical ultrasound signals to detect cracks in said bar having horizontal components;
   providing a second transducer emanating horizontal ultrasound; and,
   sweeping said second transducer vertically along the side edge of said bar to detect cracks having vertical components in said bar.

2. The process of claim 1 and wherein said second transducer emanates horizontal ultrasound at an angle with respect to the side of said bar.

3. The process of claim 2 and wherein said angle is an angle of incidence of 70° with respect to the side of said bar.

4. The process of claim 2 and including:
   providing a third transducer emanating horizontal ultrasound at an opposite angle with respect to said second transducer;
   sweeping said third transducer with said second transducer vertically along the side edge of said bar to detect cracks having vertical components in said bar.

5. The process of claim 4 and wherein said second and third transducers emanating horizontal ultrasound have angles of incidence towards one another into said bar to interrogate said bar with ultrasound in opposite directions.

* * * * *